United States Patent
Kray et al.

(10) Patent No.: US 12,448,892 B2
(45) Date of Patent: Oct. 21, 2025

(54) COMPOSITE AIRFOIL ASSEMBLY HAVING A COMPOSITE AIRFOIL AND SPAR

(71) Applicant: GENERAL ELECTRIC COMPANY, Schenectady, NY (US)

(72) Inventors: Nicholas Joseph Kray, Mason, OH (US); Balaraju Suresh, Bangalore (IN); Gary Willard Bryant, Jr., Loveland, OH (US); Abhijeet Jayshingrao Yadav, Bangalore (IN); Frank Worthoff, West Chester, OH (US); Nitesh Jain, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/653,052

(22) Filed: May 2, 2024

(65) Prior Publication Data

US 2025/0257660 A1    Aug. 14, 2025

(30) Foreign Application Priority Data

Feb. 14, 2024   (IN) .............................. 202411010190

(51) Int. Cl.
*F01D 5/14*    (2006.01)
*F01D 5/30*    (2006.01)

(52) U.S. Cl.
CPC ........... *F01D 5/147* (2013.01); *F01D 5/3092* (2013.01); *F05D 2220/30* (2013.01)

(58) Field of Classification Search
CPC ........ F01D 5/282; F01D 5/147; F01D 5/3092; F01D 5/3007; F01D 5/3084; F01D 5/3023; F01D 5/3069; F01D 7/00; F01D 21/045; F01D 25/162; F01D 5/141; F01D 11/006; F01D 5/28; F01D 25/243; F01D 5/02; F01D 25/246; F01D 5/30; F01D 5/32; F01D 5/323; F01D 9/02; F01D 9/04; F01D 9/041; B64C 11/06; B64C 11/04; B64C 2027/4736; B64C 27/48; B64C 3/185; F05D 2300/603; F05D 2220/30; F05D 2220/36; F05D 2230/60; F05D 2240/24; F05D 2260/74; F05D 2260/79; F05D 2300/702; F04D 29/323; F04D 29/023; F04D 29/324; F04D 29/34; F04D 29/36; F04D 29/362

See application file for complete search history.

(56) References Cited

U.S. PATENT DOCUMENTS 4,524,499 A * 6/1985 Grimes ................... B64C 27/46
                                                416/241 A
4,884,948 A   12/1989 Sikorski
5,222,297 A * 6/1993 Graff ...................... B29C 70/865
                                                29/889.7

(Continued)

FOREIGN PATENT DOCUMENTS

WO        2022208002 A1    10/2022

*Primary Examiner* — Eric J Zamora Alvarez
(74) *Attorney, Agent, or Firm* — McGarry Bair PC

(57) ABSTRACT

A composite airfoil assembly has a composite airfoil, a spar, and a wrap. The composite airfoil has an outer wall and a composite skin. The outer wall extends between a root and a tip. The outer wall defines an interior. The composite skin at least partially defines the outer wall. The spar having a spar centerline axis, a stem, a base, and a transition interconnecting the base and the stem.

19 Claims, 10 Drawing Sheets

(56) References Cited

U.S. PATENT DOCUMENTS

| | | |
|---|---|---|
| 6,290,466 B1 | 9/2001 | Ravenhall et al. |
| 6,443,701 B1 * | 9/2002 | Muhlbauer ............ F04D 29/36 |
| | | 416/248 |
| 7,422,419 B2 * | 9/2008 | Carvalho ............... B64C 11/06 |
| | | 416/239 |
| 8,206,118 B2 | 6/2012 | Propheter-Hinckley et al. |
| 9,039,379 B2 | 5/2015 | Radomski |
| 10,519,788 B2 | 12/2019 | Li et al. |
| 10,549,842 B2 * | 2/2020 | Andrzejewski ......... B64C 11/26 |
| 11,286,795 B2 * | 3/2022 | Kray ........................ F01D 7/00 |
| 11,426,963 B2 | 8/2022 | Okabe et al. |
| 11,767,006 B2 * | 9/2023 | Maresh ................... B64C 11/06 |
| | | 180/117 |
| 11,982,205 B1 * | 5/2024 | Jain ....................... F01D 25/246 |
| 12,091,986 B2 | 9/2024 | Joudon |
| 2009/0016890 A1 | 1/2009 | Douguet et al. |
| 2011/0194941 A1 | 8/2011 | Parkin et al. |
| 2012/0195762 A1 | 8/2012 | Bianchi |
| 2013/0272893 A1 | 10/2013 | Fabre |
| 2015/0110633 A1 * | 4/2015 | Nagle .................... B64C 11/26 |
| | | 416/218 |
| 2016/0376919 A1 * | 12/2016 | Miller .................... F01D 5/3023 |
| | | 416/220 R |
| 2019/0331127 A1 * | 10/2019 | Foster ................... F04D 29/388 |

* cited by examiner

COMPOSITE AIRFOIL ASSEMBLY HAVING A COMPOSITE AIRFOIL AND SPAR

CROSS REFERENCE TO RELATED APPLICATIONS

This application takes priority to Indian Patent Application number 202411010190, filed Feb. 14, 2024, which is incorporated herein by reference in its entirety.

TECHNICAL FIELD

The disclosure generally relates to a composite airfoil assembly, and more specifically to a composite airfoil assembly having a composite airfoil and a spar.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation, air is brought into the compressor section through the fan section where it is then pressurized in the compressor and mixed with fuel and ignited in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section, and the turbine section, respectively. The rotation of the rotating blades imparts mechanical stresses along various portions of the blade; specifically, where the blade is mounted to the disk.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
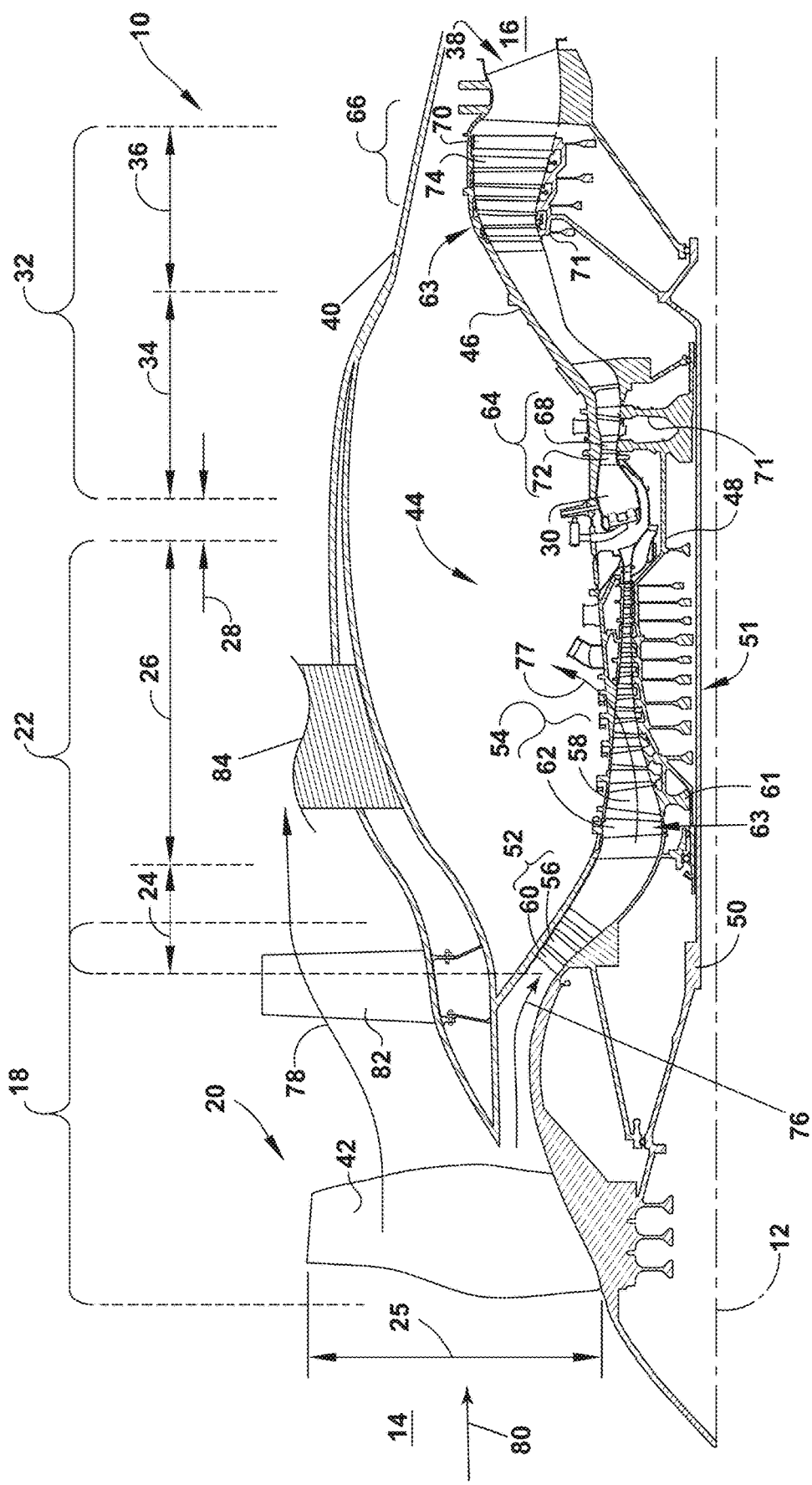
FIG. 1 is a schematic cross-sectional view of a turbine engine, the turbine engine being an unducted or open rotor turbine engine in accordance with an exemplary embodiment of the present disclosure.

Aspects of the disclosure herein are directed to a composite airfoil assembly for a turbine engine. The composite airfoil assembly includes a composite airfoil, a spar, a trunnion, and a wrap. The spar includes a stem and a base extending from the stem. The spar includes a transition extending between the stem and the base. The wrap at least partially encircles the transition. The wrap can be used to strengthen the composite airfoil assembly along the transition.

For purposes of illustration, the present disclosure will be described with respect to a composite airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for a composite airfoil assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "axial" and "longitudinal" both refer to a direction parallel to a centerline axis of an object, while the terms "radial" or "radially" refer to a direction that is perpendicular to the axial direction or away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be another suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated. As a non-limiting example, the placement of dry fibers or matrix material can be done through automatic fiber placement (AFP) or manually by hand.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10. Specifically, the fan section 18 extends radially outward from the nacelle 40. The fan section 18 includes a set of fan blades 42, and a set of stationary fan vanes 82 downstream the set of fan blades 42, both disposed radially from and circumferentially about the engine centerline 12. The set of fan blades 42 and the set of stationary fan vanes 82 extend radially outward from respective portions of the nacelle 40. As such, the set of fan blades 42 and the set of stationary fan vanes 82 can be defined as an exterior set of fan blades and an exterior set of stationary fan vanes 82, respectively. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or stationary fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor 51 refers to the combination of rotating elements throughout the unducted turbine engine 10.

Complementary to the rotary portions, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10. The turbine engine includes a pylon 84. The pylon 84 mounts the turbine engine 10 to an exterior structure (e.g., a fuselage of an aircraft, a wing, a tail wing, etc.).

It will be appreciated that the unducted turbine engine 10 can be split into at last two separate portions; a rotor portion and a stator portion. The rotor portion can be defined as any portion of the unducted turbine engine 10 that rotates about a respective rotational axis. the stator portion can be defined by a combination of non-rotating elements provided within the unducted turbine engine 10. As a non-limiting example, the rotor portion can include the plurality of fan blades 42, the compressor blades 56, 58, or the turbine blades 68, 70. As a non-limiting example, the stator portion can include the plurality of fan vanes 82, the static compressor vanes 60, 62, or the static turbine vanes 72, 74.

During operation of the unducted turbine engine 10, a freestream airflow 80 flows against a forward portion of the unducted turbine engine 10. A first portion of the freestream airflow 80 flows along the nacelle 40 and over the set of stationary fan vanes 82 as an exterior airflow 78. The exterior airflow 78 flows past the set of stationary fan vanes 82, following the curvature of the nacelle 40 and toward the exhaust section 38. A second portion of the freestream airflow 80 enters an annular area 25 defined by a swept area between an outer surface of the nacelle 40 and the tip of the fan blade 42, with this air flow being an inlet airflow 76. A portion of the inlet airflow 76 enters the engine core 44 and is described as an inlet airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The working airflow 76 and at least some of the exterior airflow 78 merge downstream of the exhaust section 38 of the unducted turbine engine 10. The working airflow 76 and the exterior airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
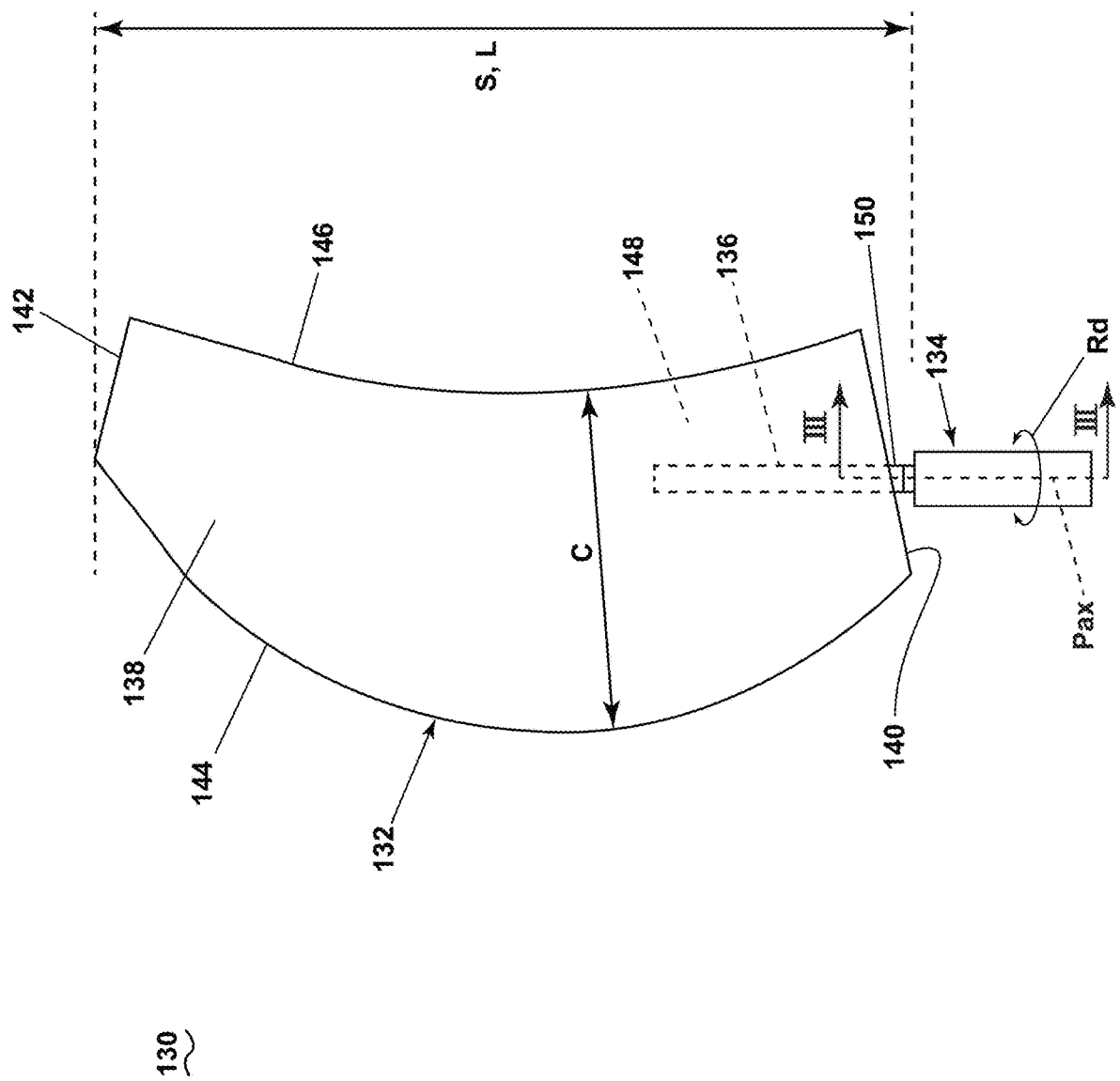
FIG. 2 is a schematic illustration of a composite airfoil assembly suitable for use within the turbine engine of FIG. 1, the composite airfoil assembly including a composite airfoil, a trunnion, a spar, and a wrap.

FIG. 2 is schematic illustration of a composite airfoil assembly 130 suitable for use within the unducted turbine engine 10 of FIG. 1. The composite airfoil assembly 130 includes a composite airfoil 132 that is any suitable airfoil of the turbine engine 10. The composite airfoil assembly 130 can be provided within the rotor portion or stator portion of the unducted turbine engine 10. As a non-limiting example, the composite airfoil 132 can be a blade of the plurality of fan blades 42, or a blade from the compressor blades 56, 58 or the turbine blades 68, 70. In the instance where the composite airfoil 132 is a blade, the composite airfoil assembly 130 can be provided within the rotor portion of the turbine engine 10. It is contemplated that the composite airfoil 132 can be a blade, vane, airfoil, or other component of any turbine engine, such as, but not limited to, a gas turbine engine, a turboprop engine, a turboshaft engine, a ducted turbofan engine, the unducted turbine engine 10, or an open rotor turbine engine.

The composite airfoil 132 includes an outer wall 138 bounding an interior 148. The outer wall 138 extends between a leading edge 144 and a trailing edge 146 to define a chordwise direction (C). The outer wall 138 further extends between a root 140 and a tip 142 to define a spanwise direction(S). The outer wall 138 can be a composite wall made of one or more layers of composite material. The one or more layers of material can be applied during the same stage or different stages of the manufacturing of the composite airfoil 132.

At least a portion of the composite airfoil 132 can include a composite material. By way of non-limiting example, the outer wall 138, the spar 136, or a combination thereof can include at least a PMC portion, a polymeric portion, or both. The PMC portion can include, but is not limited to, a matrix of thermoset (epoxies, phenolics) or thermoplastic (polycarbonate, polyvinylchloride, nylon, acrylics) and embedded glass, carbon, steel, or a combination thereof. It will be appreciated that the composite airfoil 132 can include a composite material, a non-composite metallic material, any other suitable material, or a combination thereof.

The composite airfoil assembly 130 includes a spar 136 and a trunnion 134. The spar 136 extends into the interior 148 and it coupled to the airfoil 132 through any suitable method. The spar 136 extends from the root 140. The spar 136 is operably coupled to the trunnion 134 (e.g., bonding, adhesion, fastening, or any other suitable coupling method). The trunnion 134 includes any suitable material such as, but not limited to, a metallic material or a composite material. It will be appreciated that the term composite material can further include metals with a composite architecture (e.g., a metal matrix composite). In the case of a composite material, the trunnion 134 can be any suitable composite material such as a 2D or 3D composite, a laminate composite skin, a woven or braided composite, or any other suitable composite.

The composite airfoil 132 has a span length (L) measured along the spanwise direction(S) from the root 140 at 0% the span length (L) to the tip 142 at 100% the span length (L). An entirety of the spar 136 can be located below 20% of the span length (L). Alternatively, the spar 136 can extend past 20% of the span length (L).

The composite airfoil assembly 130 includes a wrap 150 provided along a respective portion of at least the spar 136. The wrap 150 includes any suitable material. As a non-limiting example, the wrap 150 can include a composite material such that the wrap 150 is a composite wrap. As a non-limiting example, the wrap 150 can include a metallic material such that the wrap 150 is a metallic wrap.

The wrap 150 can be formed by a single layer of material or a plurality of materials, such as a plurality of stacked materials. As a non-limiting example, the wrap 150 can include a metallic material that defines a single layer of material provided along the composite airfoil assembly 130. As a non-limiting example, the wrap 150 can include a composite material that is wrapped around a respective portion of the composite airfoil assembly 130 multiple times to define a plurality of stacked composite layers.

During operation of the composite airfoil assembly 130, the trunnion 134 can rotate about a pitch axis (Pax) in a rotational direction (Rd). As the spar 136 couples the trunnion 134 to the composite airfoil 132, rotation of the trunnion 134 in the rotational direction (Rd) causes the composite airfoil 132 to rotate about the pitch axis (Pax). This rotation can be used to control the pitch of the composite airfoil assembly 130 such that the composite airfoil assembly 130 is defined as a composite variable pitch airfoil assembly. The pitch of the composite airfoil assembly 130 can be varied based on the operation or intended operation of the turbine engine (e.g., the turbine engine 10 of FIG. 1) that the composite airfoil assembly 130 is provided on. A working airflow (Fw) flows over a respective portion of the composite airfoil assembly 130, specifically, the composite airfoil 132.

Figure 3:
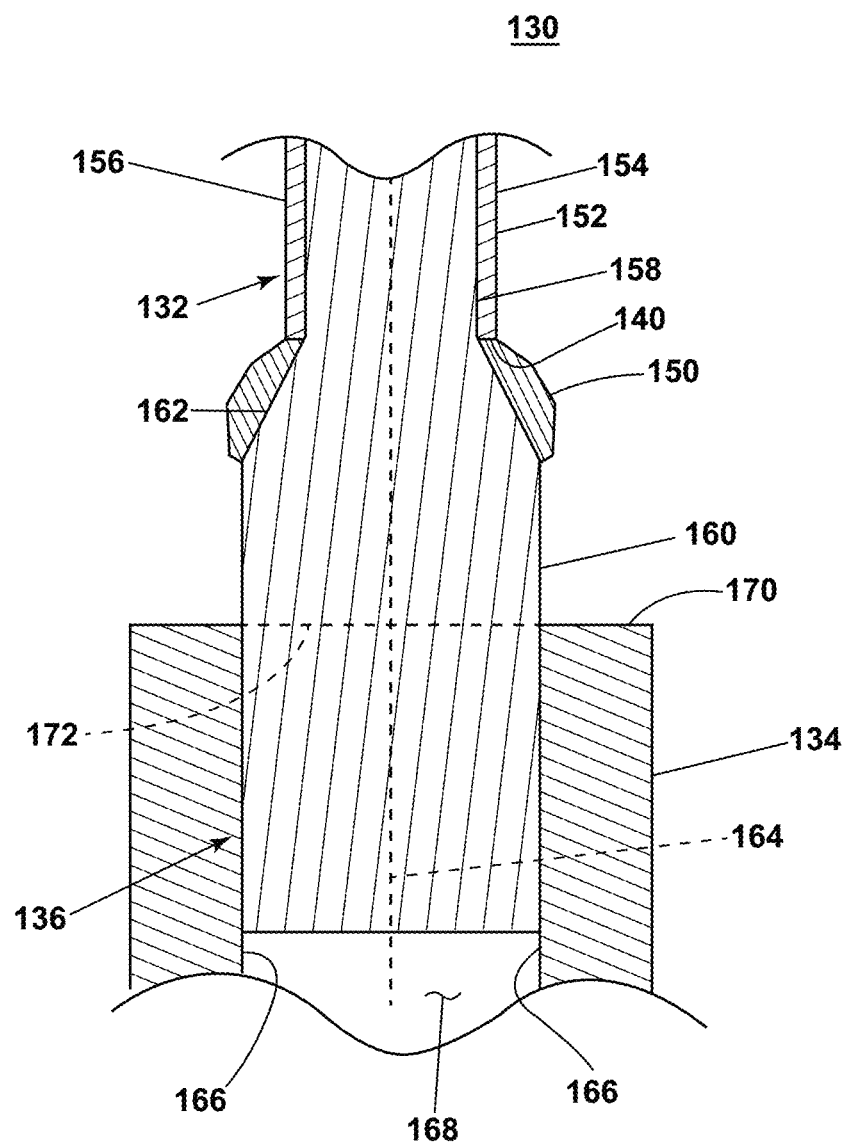
FIG. 3 is a schematic cross-sectional view of a portion of the composite airfoil assembly as seen from sectional line III-III of FIG. 2, further illustrating a stem and a base of the spar with a transition being provided therebetween, the wrap provided over the transition, the spar having a centerline axis.

FIG. 3 is a schematic cross-sectional view of a portion of the composite airfoil assembly 130 as seen from sectional line III-III of FIG. 2. The spar 136 includes a spar centerline axis 164. The spar 136 includes a stem 158 and a base 160 interconnected by a transition 162. The base 160 extends into a respective portion of the trunnion 134. The stem 158 extends into the interior 148 (FIG. 2) of the composite airfoil 132. The stem 158 and the base 160 are defined with respect to the airfoil 132. As a non-limiting example, a majority of the stem 158 is provided within the interior 148, while a majority of the base 160 is provided exterior the interior 148.

The composite airfoil 132 includes a composite skin 152. The composite skin 152 defines any suitable portion of the composite airfoil 132. As a non-limiting example, the composite skin 152 can define at least a portion of the outer wall 138 (FIG. 2) of the composite airfoil 132. The composite airfoil 132 includes a suction side 15 and an opposing pressure side 156.

The trunnion 134 includes an inner surface 166 defining a socket 168. The socket 168 can include a cross-sectional area when viewed along a plane extending along the spar centerline axis 164. The cross-sectional area of the socket 168 can be any suitable shape such as, but not limited to, rectangular, flared, curved, or a combination thereof. The trunnion 134 includes an upper edge 170 that opposes the root 140 of the composite airfoil 132. The upper edge 170 is spaced from the root 140. The upper edge 170 includes an open top 172 opening to the socket 168. The base 160 of the spar 136 extends through the open top 172 and into the socket 168.

The transition 162 defines an area interconnecting the stem 158 and the base 160. The stem 158, the base 160, and the transition 162 are each defined by respective cross-sectional areas when viewed along a plane extending along the spar centerline axis 164. The stem 158, the transition 162, and the base 160 can each include a constant or non-constant cross-sectional area. As a non-limiting example, the stem 158 can have a smaller radial width with respect to the base 160. The transition 162 can be formed as a tapered section that interconnects the stem 158 and the base 160 such that the transition 162 includes a non-constant cross-sectional area extending constantly or non-constantly from the radial width of the stem 158 at the transition 162 to the radial width of the base 160 at the transition 162.

The transition 162 can extend any suitable axial distance along the spar centerline axis 164. As a non-limiting example, the transition 162 can be denoted by a planar region of where the stem 158 meets the base 160. As a non-limiting example, the stem 158 and the spar 136 can have a constant cross-sectional area. As such, the transition 162 can be defined as a planar region where the spar 136 exits the airfoil 132. Put another way, the stem 158 can be a portion of the spar 136 provided entirely within the airfoil 132, while the base 160 can be a portion of the spar 136 provided entirely outside of the airfoil 132.

The wrap 150 is provided along and radially overlay a respective portion of the spar 136. As a non-limiting example, the wrap 150 encircles or otherwise circumferentially surrounds at least a portion of the transition 162. As a non-limiting example, the wrap 150 can fully or partially encircle the transition 162. The wrap 150 extends axially along the composite airfoil assembly 130 any suitable distance. As a non-limiting example, the wrap 150 can extend axially along the base 160 of the spar 136 and terminate axially at the transition 162. Alternatively, the wrap 150 can extend axially beyond the transition 162 and axially over at least a portion of the stem 158 or the composite skin 152. As a non-limiting example, the wrap 150 can terminate axially prior to the upper edge 170. As a non-limiting example, the wrap 150 can terminate axially at the upper edge 170.

The wrap 150 is coupled to the spar 136 through any suitable method. As a non-limiting example, the wrap 150 can be press-fit over the spar 136 and held in frictional contact with the spar 136. As a non-limiting example, the wrap 150 can be wrapped around itself and held in frictional contact with the spar 136. As a non-limiting example, the wrap 150 can be coupled to the spar 136 or any other suitable portion of the composite airfoil assembly 130 through any suitable method such as, but not limited to, adhesion, fastening, welding, frictional contact, integral formation, bonding, curing, or a combination thereof.

Figure 4:
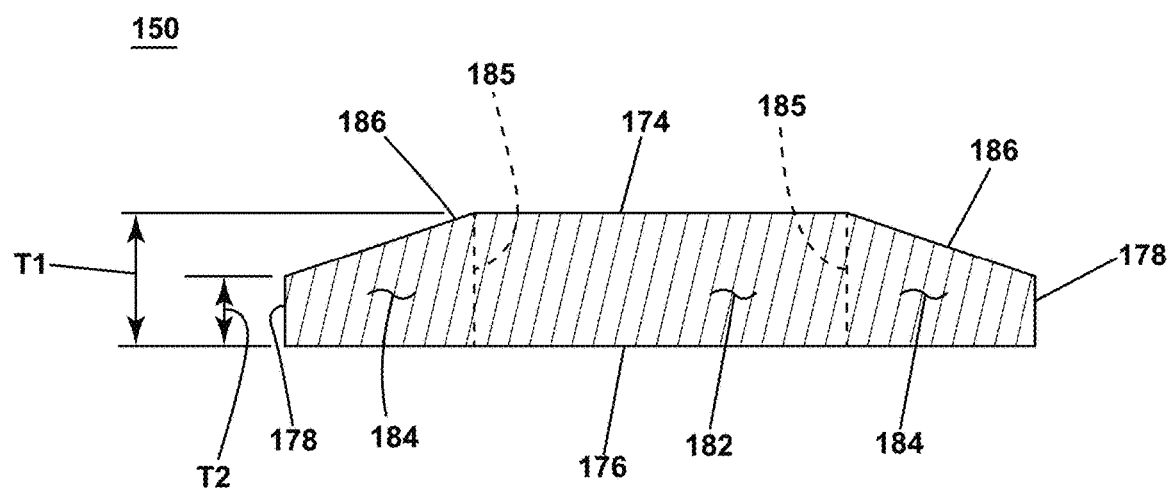
FIG. 4 is a schematic cross-sectional view of a half of the wrap of FIG. 3 as seen along a plane extending along the centerline axis of the spar, further illustrating a first region with a first thickness and a second region with a second thickness.

FIG. 4 is a schematic cross-sectional view of the wrap 150 of FIG. 3 when viewed along a plane extending along the spar centerline axis 164 (FIG. 3) and intersecting the wrap 150. The wrap 150 includes a first region 182 and a second region 184 on either side of the first region 182. The first region 182 defines a central region of the wrap 150 while the second region 184 defines edges of the wrap 150. For purposes of illustration, a transition between the first region 182 and the second region 184 has been shown in phantom lines 185.

The wrap 150 includes an outer surface 174, an inner surface 176, and a perimeter surface 178. The inner surface 176 confronts a respective portion of the composite airfoil assembly 130 (e.g., the spar 136). The perimeter surface 178 defines a perimeter of the wrap 150. The wrap 150 includes a connecting surface 186 interconnecting the outer surface 174 and the perimeter surface 178. The outer surface 174, the inner surface 176, the perimeter surface 178, and the connecting surface 186 is formed in any suitable manner, such as, but not limited to, a linear surface, a non-linear surface, or a combination thereof. As a non-limiting example, the connecting surface 186 can be rounded.

The connecting surface 186 extends inwardly from the first region 182 and to the perimeter surface 178. In other words, the connecting surface 186, and thus the second region 184 is defined by a tapered or fileted region of the wrap 150.

The wrap 150 is defined by a series of thicknesses between the inner surface 176 and outer surface 174 or connecting surface 186. The wrap 150 includes a first thickness (T1), and a second thickness (T2). The first thickness (T1) is defined as a thickness of the first region 182. The second thickness (T2) is defined as a thickness of the second region 184. The second thickness (T2) can be provided at a respective portion of the perimeter surface 178. The first region 182 can include a constant thickness such that the first thickness (T1) defines a maximum thickness of an entirety of the wrap 150. The first thickness (T1) is larger than the second thickness (T2).

The first thickness (T1) and the second thickness (T2) are any suitable size. As a non-limiting example, the first thickness (T1) and the second thickness (T2) are greater than or equal to 0.01 inches and less than or equal to 0.2 inches. As a non-limiting example, the first thickness (T1) and the second thickness (T2) are greater than or equal to 0.04 inches and less than or equal to 0.2 inches.

Figure 5:
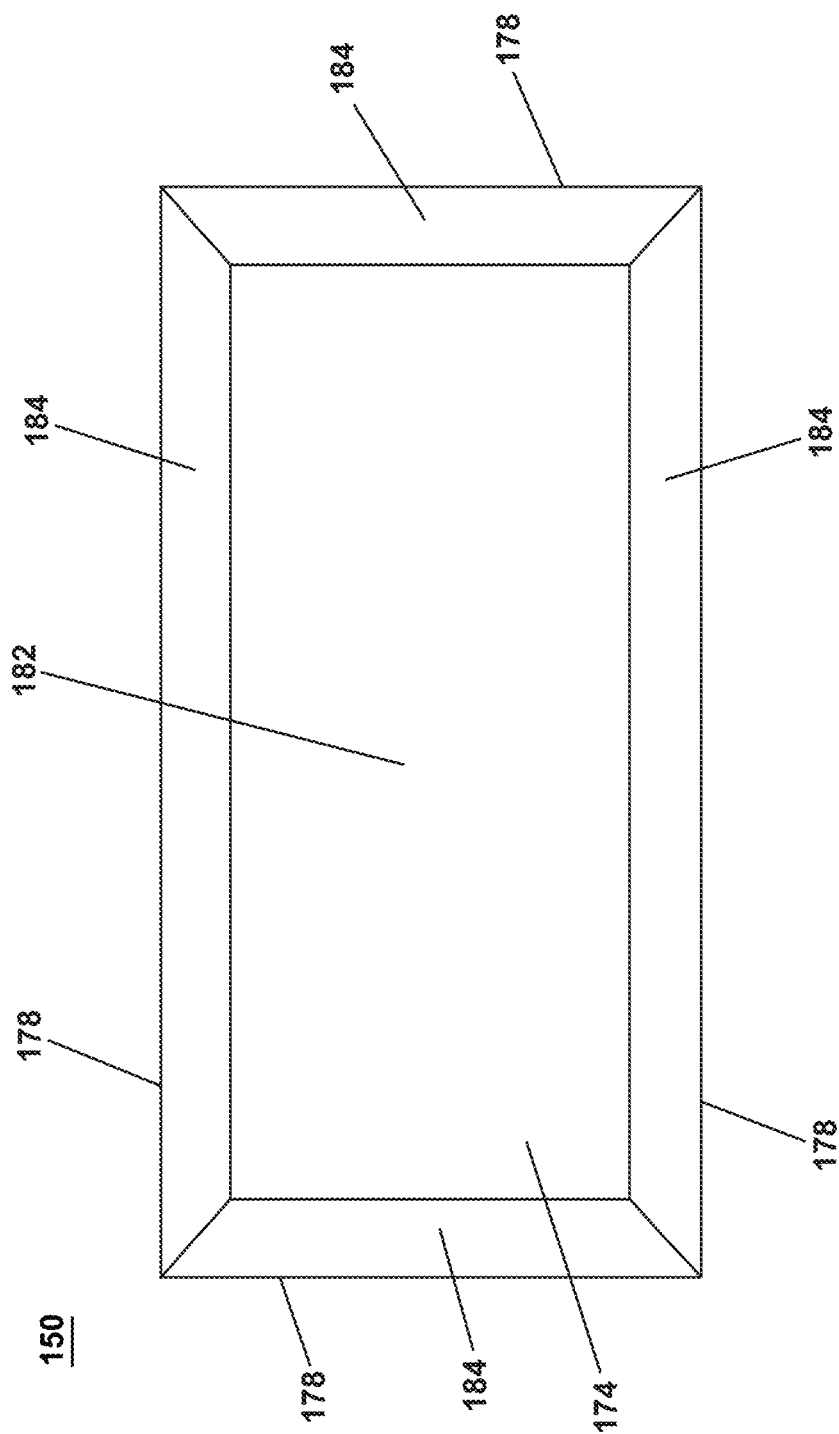
FIG. 5 is schematic view of the wrap of FIG. 3 as seen along a plane extending circumferentially with respect to the centerline axis, the wrap being flattened and further illustrating the second region defining a perimeter of the wrap.

FIG. 5 is schematic view of the wrap 150 of FIG. 3 as seen along a plane extending circumferentially with respect to the spar centerline axis 164 (FIG. 3). The wrap 150 has been splayed out and flattened for illustrative purposes only. The illustrated view is of a top-down view of the wrap 150 along the outer surface 174 of the wrap. The second region 184 extends continuously along the wrap 150 such that the first region 182 is surrounded or encompassed by the second region 184.

As illustrated, the second region 184 extends continuously about an entirety of the first region 182 and defines an entirety of the perimeter surface 178. It will be appreciated, however, that at least a portion of the first region 182 can extend to the perimeter surface 178. As a non-limiting example, the second region 184 can be provided on opposing sides of the wrap 150.

The wrap 150 can include a rectangular surface area when viewed as illustrated from a top-down perspective. It will be appreciated that the wrap 150 can include any suitable shaped surface area such as, but not limited to, a rectangular surface area, a trapezoidal surface area, a triangular surface area, a circular surface area, an ovular surface area, a hexagonal surface area, or the like.

Figure 6:
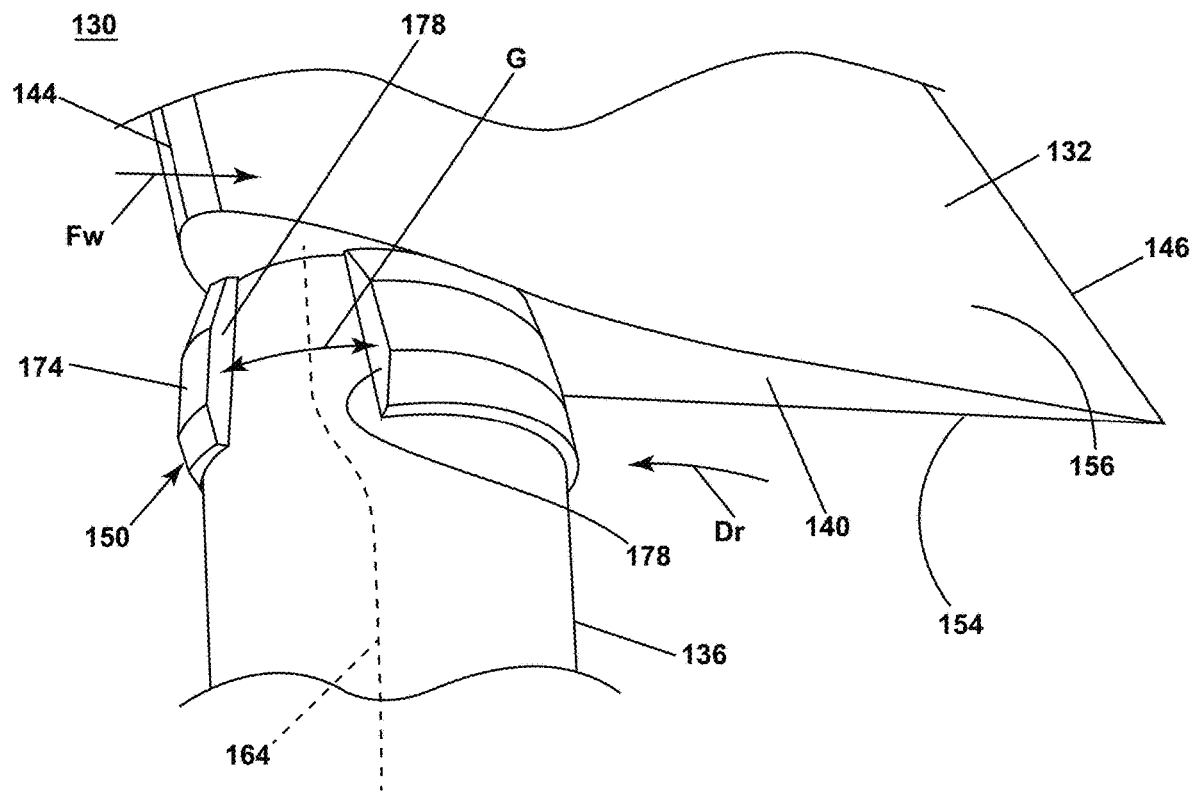
FIG. 6 is a bottom-up perspective view of the composite airfoil assembly of FIG. 2, further illustrating a gap formed between opposing ends of the wrap.

FIG. 6 is a bottom-up perspective view of the composite airfoil assembly 130 of FIG. 2. The airfoil 132 includes the root 140. The airfoil 132 includes the suction side 156 and the pressure side 156. The outer surface 174 of the wrap 150 defines a radially outer portion of the wrap 150. The wrap 150 contacts or is spaced from the root 140 of the airfoil 132.

The wrap 150 extends circumferentially about an entirety of or less than an entirety of the spar centerline axis 164. As a non-limiting example, at least a portion of the perimeter surface 178 of the wrap 150 can be circumferentially spaced from a circumferentially opposing portion of the perimeter surface 178 to define a gap (G) therebetween. The gap (G) is any suitable size. As a non-limiting example, the gap (G) could be zero such that circumferentially opposing ends of the wrap 150 touch.

A size of the gap (G) is selected based on, at least partially, the manufacture of the composite airfoil assembly 130. As a non-limiting example, the wrap 150 can be flattened (as illustrated in FIG. 5) prior to being coupled to the spar 136. The wrap 150 can then be bent or otherwise wrapped around a respective portion of the spar 136. It is contemplated that the larger the gap (G), the less distance that the wrap 150 needs to be bent. As such, providing a larger gap (G) decreases the burden of coupling the wrap 150 to the spar 136. As a non-limiting example, the wrap 150 includes a metallic material. The wrap 150 can be heated to increase the mouldability of the wrap 150. The heated wrap 150 can then be press-fit around a respective portion of the composite airfoil assembly 130 and subsequently coupled to the composite airfoil assembly 130 through any suitable coupling method such as, but not limited to, welding, adhesion, friction, boning, fastening, or the like.

The wrap 150 can have any suitable construction. As a non-limiting example, the connecting surface 186 can extend about less than an entirety of the total perimeter surface 178. As a non-limiting example, the connecting surface 186, or tapered surface, can be provided on axially opposing sides of the wrap 150, with respect to the spar centerline axis 164, and the first region 182 can extend to the perimeter surface 178 on circumferentially opposing ends of the wrap 150. As a non-limiting example, the connecting surface 186 can be omitted from the circumferentially opposing ends of the wrap 150 when the gap (G) is zero such that the circumferentially opposing ends touch.

During operation of the composite airfoil assembly 130, a working airflow (Fw) flows over the composite airfoil 132 from the leading edge 144 and to the trailing edge 146. As the working airflow (Fw) flows over the composite airfoil 132, the composite airfoil extracts a work from the working airflow (Fw). As a non-limiting example, the composite airfoil assembly 130 can be provided within the fan section 18 (FIG. 1), and the composite airfoil 132 can be used to direct the working airflow into a respective portion of the turbine engine 10 (FIG. 1). The composite airfoil 132 can further rotate in an operational rotational direction (Dr). Alternatively, the composite airfoil 132 can be static.

It is contemplated that during operation of the composite airfoil assembly 130, at least one of the working airflow (Fw), the rotation of the composite airfoil 132 in the operational rotational direction (Dr), or a combination thereof, transfers or induces a force to the composite airfoil 132. As a non-limiting example, the working airflow (Fw) can transfer a force in-line with the direction of the working airflow (Fw) to the composite airfoil 132. As a non-limiting example, the rotation of the composite airfoil 132 in the operational rotational direction (Dr) causes a force opposite the operational rotational direction (Dr) to be experienced along the composite airfoil 132 due to the drag of the composite airfoil 132. The forces experienced along the composite airfoil 132 during operation of the composite airfoil assembly 130 will hereinafter be referred to as the operational forces. The operational forces can further include any other suitable force, such as, but not limited to, external forces applied to the composite airfoil assembly 130.

The operational forces along the composite airfoil 132 are transferred from the composite airfoil 132 and to the spar 136. It is contemplated that the spar 136 will experience the largest forces at the transition 162 (FIG. 3). The wrap 150 is used to strengthen the composite airfoil assembly 130 at the transition 162 where the highest operational forces along the spar 136 are experienced.

The material of the wrap 150, the size of the wrap 150, the orientation of the wrap 150, or a combination thereof is used to strengthen the composite airfoil assembly 130 against the operational force. As a non-limiting example, the wrap 150 can be metallic and therefore be more resilient to the operational forces than the composite ceramic material of the spar 136. It is contemplated that the construction of the wrap 150 can result in a wrap 150 being better adapted to strengthen the spar 136 against the operational forces. As a non-limiting example, forming the wrap 150 with a tapered section (e.g., the second region 184) helps with transferring the operational forces from the spar 136 and to the wrap 150. Specifically, the connecting surface 186 creates a smoother transition between the wrap 150 and the spar 136, as opposed to the wrap 150 being formed without the connecting surface 186. The smooth transition between the wrap 150 and the spar 136, in turn, reduces potential edge of contact stresses between the wrap 150 and the spar 136. The wrap 150 further provides for a load transition from the composite skin 152 and to the spar 136. The wrap 150 helps distribute loads between the composite skin 152 and the spar 136.

Figure 7:
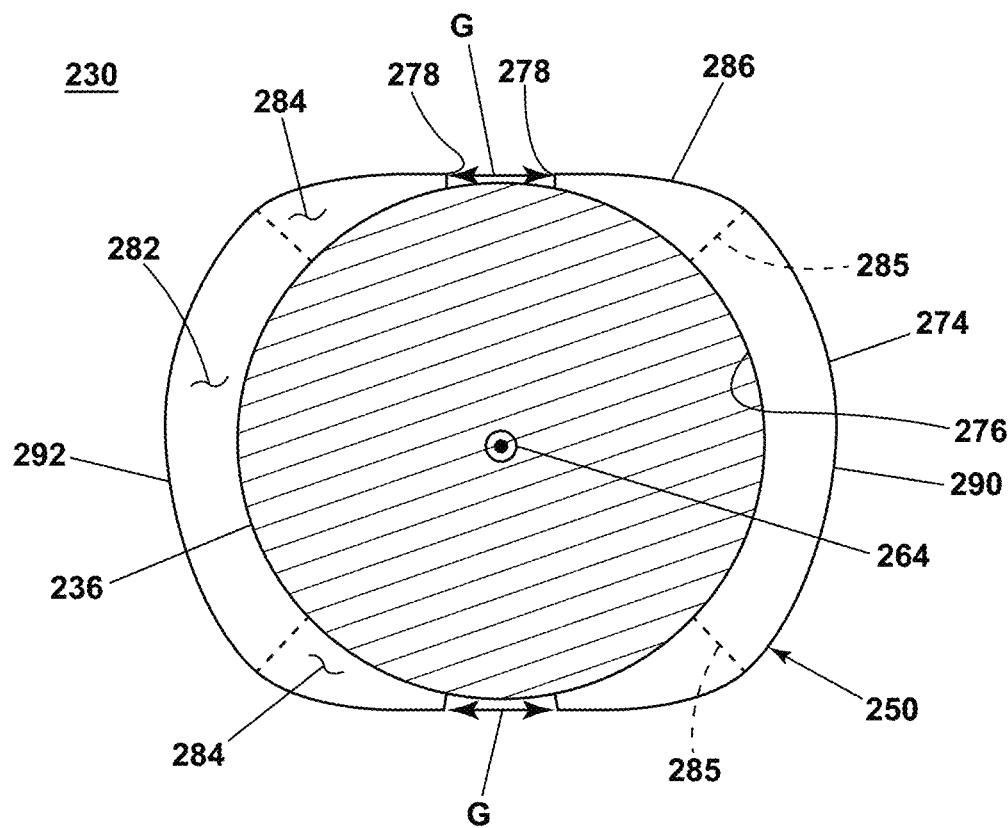
FIG. 7 is a top-down cross-sectional view of an exemplary airfoil assembly suitable for use as the composite airfoil assembly of FIG. 2, further illustrating a wrap including a first body and a second body.

FIG. 7 is a top-down cross-sectional view of an exemplary airfoil assembly 230 suitable for use as the composite airfoil assembly 130 of FIG. 2. The composite airfoil assembly 230 is similar to the composite airfoil assembly 130; therefore, like parts will be identified with like numerals increased to the 230 series with it being understood that the description of the composite airfoil assembly 130 applies to the composite airfoil assembly 230 unless indicated otherwise.

The composite airfoil assembly 230 includes a spar 236. The spar 236 has a spar centerline axis 264. The composite airfoil assembly 230 incudes a wrap 250. The wrap 250 includes an inner surface 276, an outer surface 274, a perimeter surface 278, and a connecting surface 286. The wrap 250 includes a first region 282 and a second region 284. The transition between the first region 282 and the second region 284 is identified by a phantom line 285.

The wrap 250 is similar to the wrap 150 (FIG. 3) in that the wrap includes a gap (G) formed between circumferentially opposing portions of the perimeter surface 278. The wrap 250, however, includes a plurality of bodies. As a non-limiting example, the wrap 250 includes a first body 290 and a second body 292 circumferentially spaced from the first body 290. As such, two gaps (G) are provided. While two bodies are illustrated, it will be appreciated that the wrap 250 includes any number of two or more bodies circumferentially spaced about the spar centerline axis 264. While described as two completely separate bodies, it will be appreciated that the first body 290 is coupled to the second body 292. As a non-limiting example, the first body 290 and the second body 292 can extend from a common body (not illustrated) such that the wrap 250 that extends about an entirety of or at least a portion of the spar centerline axis 264. The wrap 250 is symmetric or asymmetrical about the spar centerline axis 264.

The wrap 250 illustrated in FIG. 7 decreases the burden of coupling the wrap 250 to the spar 236. As the wrap 250 includes at least two bodies, the total distance that each body of the wrap 250 has to be bent around the spar 236 is reduced in comparison with the wrap 150, which can include a singular body.

Figure 8:
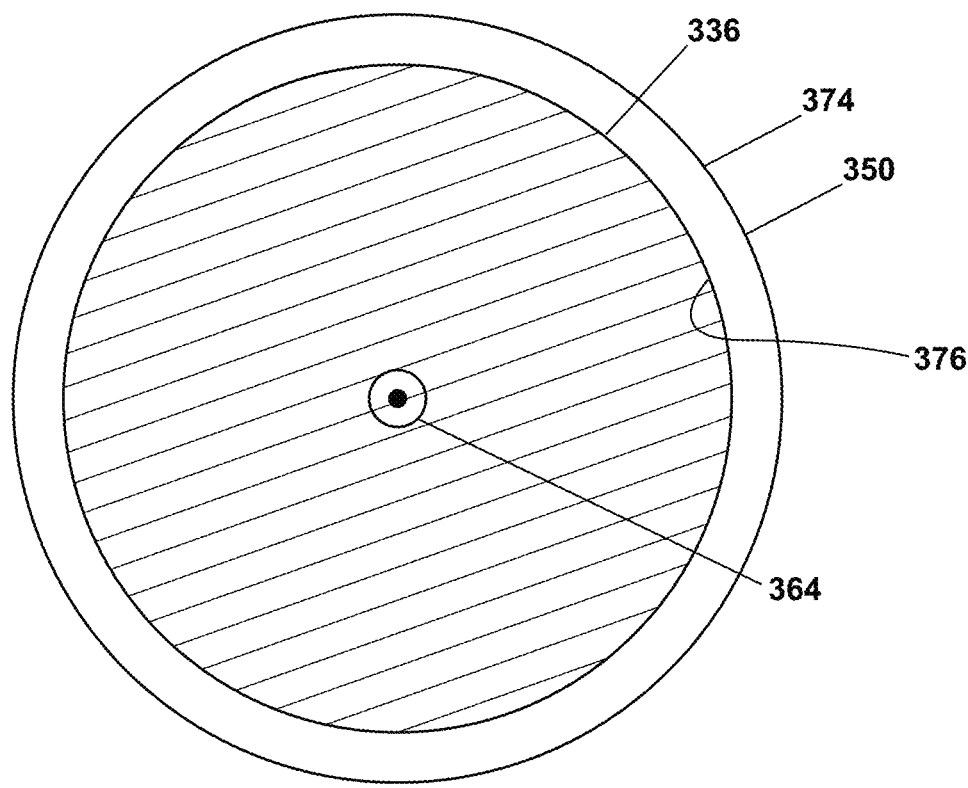
FIG. 8 is a top-down cross-sectional view of an exemplary airfoil assembly suitable for use as the composite airfoil assembly of FIG. 2, further illustrating a wrap including a continuous body.

FIG. 8 is a top-down cross-sectional view of an exemplary airfoil assembly 330 suitable for use as the composite airfoil assembly 130 of FIG. 2. The composite airfoil assembly 330 is similar to the composite airfoil assembly 130, 230; therefore, like parts will be identified with like numerals increased to the 330 series with it being understood that the description of the composite airfoil assembly 130, 230 applies to the composite airfoil assembly 330 unless indicated otherwise.

The composite airfoil assembly 330 includes a spar 336. The spar 336 has a spar centerline axis 364. The composite airfoil assembly 330 incudes a wrap 350. The wrap 350 includes an inner surface 376 and an outer surface 374.

The wrap 350 is similar to the wrap 150 (FIG. 3), 250 (FIG. 7) in that the wrap 350 at least partially encircles the spar centerline axis 364. The wrap 350, however, is formed as a continuous body that extends circumferentially continuously about an entirety of the spar centerline axis 364.

The wrap 350 can include a composite material. The wrap 350 can be co-cured with or otherwise bonded to at least the spar 336. As such, the wrap 350 and the spar 336 can form a unitary body.

The wrap 350, when formed with a composite material, can further allow for additional tailoring of material properties of the wrap 350 when compared to a wrap formed with a metallic material. Composite materials can include a set of composite plies. Each composite ply can include at least one tow of fibers. As used herein, a tow refers to a bundle of continuous filaments or fibers, with each fiber in the tow having and extending along a respective centerline axis. When a composite ply includes more than one tow of fibers, the tow of fibers of the composite ply can be interwoven (e.g., braided or woven) together and subsequently bonded together to form a composite ply with at least a bidirectional fiber orientation. A composite ply with a single tow of fibers has a unidirectional fiber orientation. The variation of the number of tows, and thus the fiber orientation, is used to tailor the material properties of the composite ply. As a non-limiting example, a composite ply with a bidirectional fiber orientation can have a larger resilience to a shear stresses than a composite ply with a unidirectional fiber orientation.

The wrap 350 can be formed with any suitable number of composite plies having any suitable fiber orientation. The number of composite plies or the fiber orientation of the composite plies of the wrap 350 can be selected based on the anticipated forces that will be experienced along the composite airfoil assembly 330 where the wrap 350 is provided. In other words, the wrap 350 can be constructed to be best fit to withstand the anticipated forces that the wrap 350 will experience.

Figure 9:
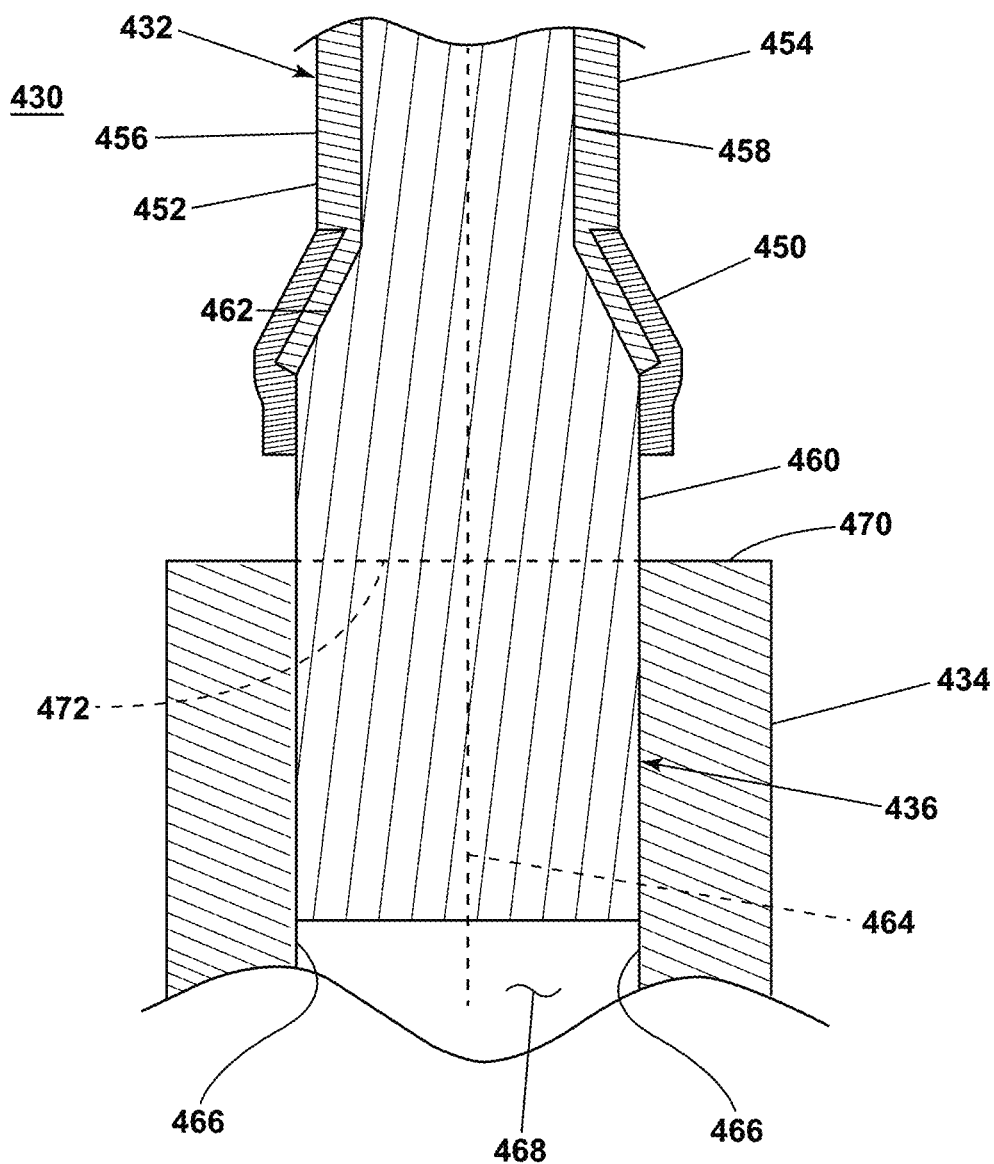
FIG. 9 is a schematic cross-sectional view of a portion of an exemplary airfoil assembly suitable for use as the composite airfoil assembly of FIG. 2, further comprising a composite airfoil with a composite skin, and a wrap provided over a respective portion of the composite skin.

FIG. 9 is a schematic cross-sectional view of an exemplary airfoil assembly 430 suitable for use as the composite airfoil assembly 130 of FIG. 2. The composite airfoil assembly 430 is similar to the composite airfoil assembly 130, 230, 330; therefore, like parts will be identified with like numerals increased to the 430 series with it being understood that the description of the composite airfoil assembly 130, 230, 330 applies to the composite airfoil assembly 430 unless indicated otherwise.

The composite airfoil assembly 430 includes a spar 436, a trunnion 434, and a composite airfoil 432. The composite airfoil 432 includes a composite skin 452. The composite airfoil 432 includes a suction side 454 and a pressure side 456. The spar 436 includes a stem 458 extending into a respective portion of the composite airfoil 432 and includes a base 460. The base 460 and the stem 458 are interconnected by a transition 462. The spar 436 has a spar centerline axis 464. The trunnion 434 includes an upper edge 470 with an open top 472, and an inner surface 466 defining a socket 468. The socket 468 opens up to the open top 472. The composite airfoil assembly 430 incudes a wrap 450. The wrap 450 is formed as any suitable wrap 150 (FIG. 3), 250 (FIG. 7), 350 (FIG. 8) described herein.

The composite airfoil assembly 430 is similar to the composite airfoil assembly 130 (FIG. 2), 230 (FIG. 7), 330 (FIG. 8) in that the wrap 450 encircles at least the transition 462. The composite airfoil assembly 430, however, includes the composite skin 452 extends along the transition 462. The composite skin 452 can terminate along the transition 462 or extend axially beyond the transition 462 and over a respective portion of the base 460. At least a portion of the wrap 450 is provided radially over a respective portion of the composite skin 452 such that at least a portion of the composite skin 452 is radially sandwiched between the spar 436 and the wrap 450. As a non-limiting example, the wrap 450 can extend over an entirety of the composite skin 452 that extends past the transition and towards the trunnion 434. The wrap 450 can extend axially past where the composite skin 452 terminates and axially towards the trunnion 434 such that a first portion of the wrap 450 directly contacts and overlays the composite skin 452, and a second portion of the wrap 450 directly contacts and overlays the spar 436. Alternatively, the wrap 450 can axially terminate where the composite skin 452 axially terminates.

Providing the wrap 450 over at least a portion of the composite skin 452 allows for a stronger bond between the composite airfoil 432 and the spar 436. The wrap 450 can be wrapped around a portion of the composite skin 452, the spar 436, or a combination thereof and subsequently coupled to the composite skin 452, the spar 436 or a combination thereof. As a non-limiting example, the wrap 450 can be bonded to or co-cured with both the composite skin 452 and the spar 436 such that the wrap 450, the composite skin 452 and the spar 436 form a unitary body. As a non-limiting example, the wrap 450 can be wrapped around the composite skin 452, the spar 436, or a combination thereof such that the composite skin 452 is held in frictional contact with the spar 436 due to a compression of the wrap 450 around the composite skin 452.

Figure 10:
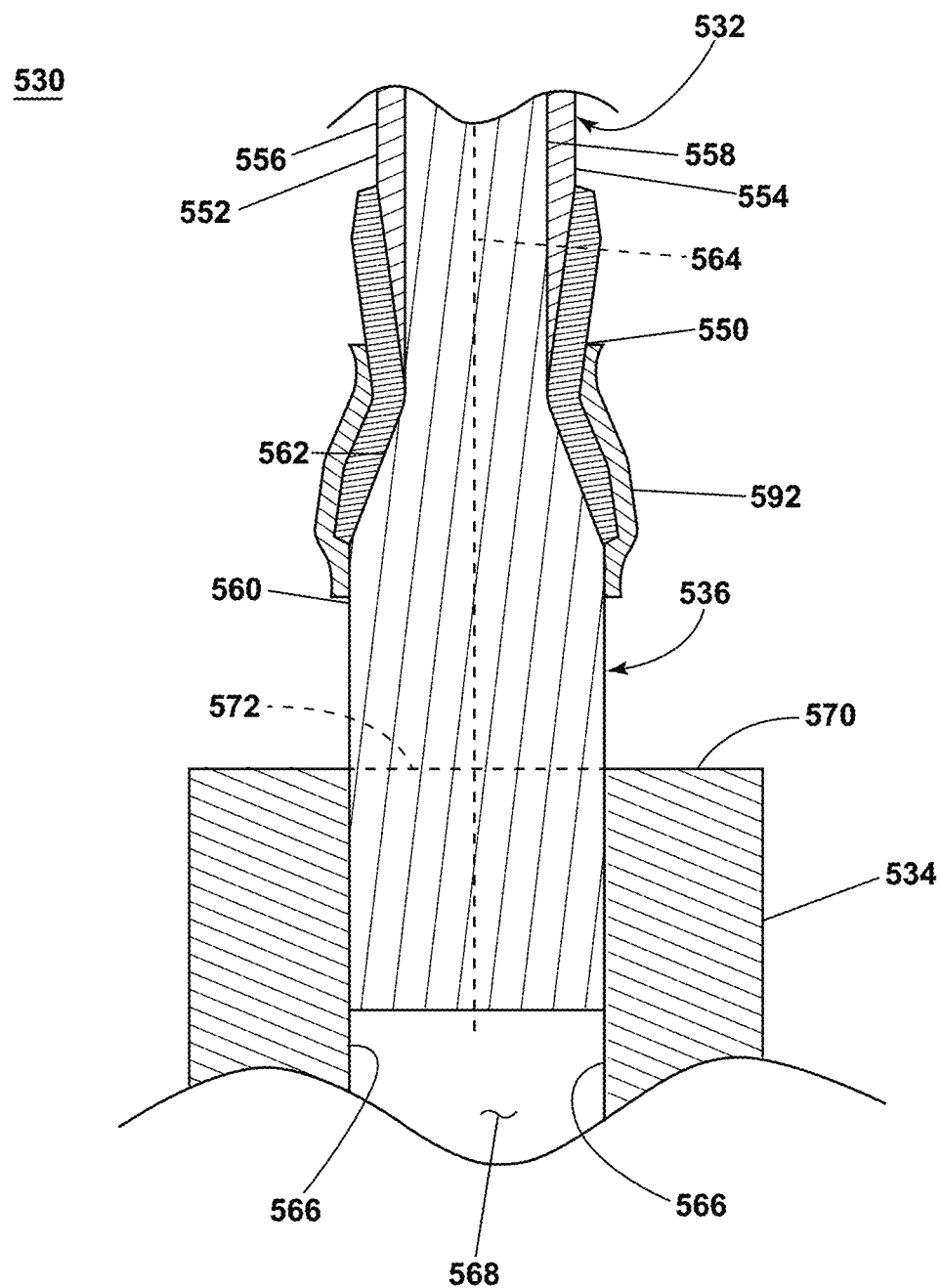
FIG. 10 is a schematic cross-sectional view of a portion of an exemplary airfoil assembly suitable for use as the composite airfoil assembly of FIG. 2, further comprising a wrap and a second wrap.

FIG. 10 is a schematic cross-sectional view of an exemplary airfoil assembly 530 suitable for use as the composite airfoil assembly 130 of FIG. 2. The composite airfoil assembly 530 is similar to the composite airfoil assembly 130, 230, 330, 430; therefore, like parts will be identified with like numerals increased to the 530 series with it being understood that the description of the composite airfoil assembly 130, 230, 330, 430 applies to the composite airfoil assembly 530 unless indicated otherwise.

The composite airfoil assembly 530 includes a spar 536, a trunnion 534, and a composite airfoil 532. The composite airfoil 532 includes a composite skin 552. The composite airfoil 532 includes a suction side 554 and a pressure side 556. The spar 536 includes a stem 558 extending into a respective portion of the composite airfoil 532 and includes a base 560. The base 560 and the stem 558 interconnected by a transition 562. The spar 536 has a spar centerline axis 564. The trunnion 534 includes an upper edge 570 with an open top 572, and an inner surface 566 defining a socket 568. The socket 568 opens up to the open top 572. The composite airfoil assembly 530 incudes a wrap 550. The wrap 550 is formed as any suitable wrap 150 (FIG. 3), 250 (FIG. 7), 350 (FIG. 8), 450 (FIG. 9) described herein.

The composite airfoil assembly 530 is similar to the composite airfoil assembly 130 (FIG. 2), 230 (FIG. 7), 330 (FIG. 8), 430 (FIG. 9) in that the wrap 550 encircles at least the transition 562. At least a portion of the wrap 550, like the wrap 450 (FIG. 9), extends over the composite skin 552 such that at least a portion of the composite skin 552 is provided radially between a respective portion of the wrap 550 and the spar 536. The wrap 550, however, extends axially beyond the transition 562 an over a respective portion of the stem 558.

The composite airfoil assembly 530 further includes a second wrap 592. The second wrap 592 can be provided radially over at least a portion of the wrap 550. The second wrap 592 can extend axially beyond the transition 562 and axially beyond a termination of the wrap 550. Alternatively, the second wrap 592 can terminate axially along the transition 562, terminate axially at a termination of the wrap 550 or a combination thereof.

The wrap 550 and the second wrap 592 can include the same or differing material or construction. As a non-limiting example, the wrap 550, like the wrap 150 (FIG. 2), can include a gap (not illustrated) formed between the circumferentially adjacent portions of the wrap 550. As a non-limiting example, the wrap 550 can be formed like the wrap 150 (FIG. 2), and the second wrap 592 can be formed like the wrap 350 (FIG. 8). As such, the wrap 550 can include the gap, and the second wrap 592 can extend continuously about the spar centerline axis 564 including circumferentially over the gap. As such, at least a portion of the second wrap 592 can contact or otherwise directly overlay a respective portion of the spar 536 (e.g., through the gap). As a non-limiting example, the wrap 550 or the second wrap 592 can include a metallic material while the other of the wrap 550 or the second wrap 592 can include a composite material. As a non-limiting example, the wrap 550 can extend circumferentially about less than an entirety of the spar centerline axis 564, while the second wrap 592 can extend circumferentially about greater than or equal to the entirety of the spar centerline axis 564.

Benefits associated with the present disclosure include a variable pitch airfoil assembly with a greater resilience to the operational forces when compared to a conventional variable pitch airfoil assembly. For example, the conventional variable pitch airfoil assembly can include a spar extending from a composite airfoil and into a trunnion. The spar, however, will experience a relatively large force at the location where the spar transitions from the stem to the base or otherwise where the spar exits the composite airfoil. This relatively large force can cause damage to the spar itself. The variable pitch airfoil assembly as described herein, however, includes at least one of the wrap or the second wrap, which are used to strengthen the region of the spar that will experience these relatively large forces. This, in turn, limits or otherwise minimizes the damage associated with the operational forces experienced along the variable pitch airfoil assembly when compared to the conventional variable pitch airfoil assembly.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal languages of the claims, or if they include equivalent structural elements with insubstantial differences from the literal languages of the claims.

Further aspects are provided by the subject matter of the following clauses:

A composite airfoil assembly comprising a composite airfoil having an outer wall extending between a root and a tip, and defining an interior, the composite airfoil having a composite skin forming at least a portion of the outer wall, a spar having a spar centerline axis, a stem extending into at least a portion of the interior, a base located exterior the root of the composite airfoil, and a transition interconnecting the stem and the base, and a wrap at least partially encircling the transition.

The composite airfoil assembly of any preceding clause, wherein the wrap comprises a metallic material.

The composite airfoil assembly of any preceding clause, wherein the wrap fully circumferentially encircles the transition.

The composite airfoil assembly of any preceding clause, wherein the wrap comprises a composite material.

The composite airfoil assembly of any preceding clause, wherein the composite skin extends axially over the transition with respect to the spar centerline axis.

The composite airfoil assembly of any preceding clause, wherein the composite skin extends radially between the wrap and the transition.

The composite airfoil assembly of any preceding clause, wherein the wrap extends axially beyond the transition and over at least a portion of the composite skin.

The composite airfoil assembly of any preceding clause, wherein the wrap is a first wrap, the composite airfoil assembly further comprising a second wrap at least partially encircling the first wrap.

The composite airfoil assembly of any preceding clause, wherein the first wrap includes a metallic material and the second wrap includes a composite material.

The composite airfoil assembly of any preceding clause, wherein the first wrap extends circumferentially about less than an entirety of the spar centerline axis and the second wrap extends circumferentially greater than or equal to the entirety of the spar centerline axis.

The composite airfoil assembly of any preceding clause, wherein the wrap includes at least two bodies circumferentially spaced from one another.

The composite airfoil assembly of any preceding clause, wherein the wrap includes circumferentially distal ends with a gap formed therebetween.

The composite airfoil assembly of any preceding clause, wherein the gap is larger than zero.

The composite airfoil assembly of any preceding clause, wherein the wrap includes a cross-sectional area when viewed along a horizontal plane perpendicular to the spar centerline axis, the cross-sectional area including a first region with a first thickness and a second region with a second thickness that is less than the first thickness.

The composite airfoil assembly of any preceding clause, wherein the second thickness linearly or non-linearly decreases in size from the first region and to a thickness of the wrap.

The composite airfoil assembly of any preceding clause, wherein the first thickness is constant.

A turbine engine including the composite airfoil assembly of any preceding clause, the turbine engine further comprising a fan section, a compressor section, a combustion section, and a turbine section in serial flow arrangement and defining a stator portion and a rotor portion, which rotates about an engine centerline, the composite airfoil being provided within the rotor portion.

A turbine engine including the composite airfoil assembly of any preceding clause, the turbine engine being an unducted turbine engine and the composite airfoil is an external fan blade.

The turbine engine of any preceding clause, wherein the wrap comprises a metallic material.

The turbine engine of any preceding clause, wherein the wrap fully circumferentially encircles the transition.

The turbine engine of any preceding clause, wherein the wrap comprises a composite material.

The turbine engine of any preceding clause, wherein the composite skin extends axially over the transition with respect to the spar centerline axis.

The turbine engine of any preceding clause, wherein the composite skin extends radially between the wrap and the transition.

The turbine engine of any preceding clause, wherein the wrap extends axially beyond the transition and over at least a portion of the composite skin.

The turbine engine of any preceding clause, wherein the wrap is a first wrap, the composite airfoil assembly further comprising a second wrap at least partially encircling the first wrap.

The turbine engine of any preceding clause, wherein the first wrap includes a metallic material and the second wrap includes a composite material.

The turbine engine of any preceding clause, wherein the first wrap extends circumferentially about less than an entirety of the spar centerline axis and the second wrap extends circumferentially greater than or equal to the entirety of the spar centerline axis.

extends circumferentially greater than or equal to the entirety of the spar centerline axis.

The turbine engine of any preceding clause, wherein the wrap includes at least two bodies circumferentially spaced from one another.

The turbine engine of any preceding clause, wherein the wrap includes circumferentially distal ends with a gap formed therebetween.

The turbine engine of any preceding clause, wherein the gap is larger than zero.

The turbine engine of any preceding clause, wherein the wrap includes a cross-sectional area when viewed along a horizontal plane perpendicular to the spar centerline axis, the cross-sectional area including a first region with a first thickness and a second region with a second thickness that is less than the first thickness.

The turbine engine of any preceding clause, wherein the second thickness linearly or non-linearly decreases in size from the first region and to a thickness of the wrap.

The turbine engine of any preceding clause, wherein the first thickness is constant.

A composite variable pitch airfoil assembly comprising a composite airfoil having an outer wall extending between a root and a tip, and defining an interior, the composite airfoil having a composite skin forming at least a portion of the outer wall, a spar having a spar centerline axis, a stem extending into at least a portion of the interior, a base located exterior the root of the composite airfoil, and a transition interconnecting the stem and the base, and a trunnion having an upper edge with an open top, and a wall having a set of interior surfaces defining a socket extending from the open top, with at least a portion of the base extending through the open top and into the socket, and a wrap at least partially encircling the transition.

The composite variable pitch airfoil assembly of any preceding clause, wherein the wrap terminates axially prior to the trunnion, with respect to the spar centerline axis.

The composite variable pitch airfoil assembly of any preceding clause, wherein the wrap comprises a metallic material.

The composite variable pitch airfoil assembly of any preceding clause, wherein the wrap fully circumferentially encircles the transition.

The composite variable pitch airfoil assembly of any preceding clause, wherein the wrap comprises a composite material.

The composite variable pitch airfoil assembly of any preceding clause, wherein the composite skin extends axially over the transition with respect to the spar centerline axis.

The composite variable pitch airfoil assembly of any preceding clause, wherein the composite skin extends radially between the wrap and the transition.

The composite variable pitch airfoil assembly of any preceding clause, wherein the wrap extends axially beyond the transition and over at least a portion of the composite skin.

The composite variable pitch airfoil assembly of any preceding clause, wherein the wrap is a first wrap, the composite airfoil assembly further comprising a second wrap at least partially encircling the first wrap.

The composite variable pitch airfoil assembly of any preceding clause, wherein the first wrap includes a metallic material and the second wrap includes a composite material.

The composite variable pitch airfoil assembly of any preceding clause, wherein the first wrap extends circumferentially about less than an entirety of the spar centerline axis and the second wrap extends circumferentially greater than or equal to the entirety of the spar centerline axis.

The composite variable pitch airfoil assembly of any preceding clause, wherein the wrap includes at least two bodies circumferentially spaced from one another.

The composite variable pitch airfoil assembly of any preceding clause, wherein the wrap includes circumferentially distal ends with a gap formed therebetween.

The composite variable pitch airfoil assembly of any preceding clause, wherein the gap is larger than zero.

The composite variable pitch airfoil assembly of any preceding clause, wherein the wrap includes a cross-sectional area when viewed along a horizontal plane perpendicular to the spar centerline axis, the cross-sectional area including a first region with a first thickness and a second region with a second thickness that is less than the first thickness.

The composite variable pitch airfoil assembly of any preceding clause, wherein the second thickness linearly or non-linearly decreases in size from the first region and to a thickness of the wrap.

The composite variable pitch airfoil assembly of any preceding clause, wherein the first thickness is constant.

What is claimed is:
1. A composite airfoil assembly comprising:
   a composite airfoil having an outer wall extending between a root and a tip, and defining an interior, the composite airfoil having a composite skin forming at least a portion of the outer wall;

a spar having a spar centerline axis, a stem extending into at least a portion of the interior, a base located exterior the root of the composite airfoil, and a transition interconnecting the stem and the base; and a wrap at least partially encircling the transition, the wrap contacting a respective portion of the spar and the composite airfoil.

2. The composite airfoil assembly of claim 1, wherein the wrap comprises a metallic material.

3. The composite airfoil assembly of claim 1, wherein the wrap fully circumferentially encircles the transition.

4. The composite airfoil assembly of claim 1, wherein the wrap comprises a composite material.

5. The composite airfoil assembly of claim 1, wherein the composite skin extends axially over the transition with respect to the spar centerline axis.

6. The composite airfoil assembly of claim 1, wherein the wrap is a first wrap, the composite airfoil assembly further comprising a second wrap at least partially encircling the first wrap.

7. The composite airfoil assembly of claim 6, wherein the first wrap extends circumferentially about less than an entirety of the spar centerline axis and the second wrap extends circumferentially greater than or equal to the entirety of the spar centerline axis.

8. The composite airfoil assembly of claim 1, wherein the wrap includes a cross-sectional area when viewed along a horizontal plane perpendicular to the spar centerline axis, the cross-sectional area including a first region with a first thickness and a second region with a second thickness that is less than the first thickness.

9. The composite airfoil assembly of claim 8, wherein the second thickness linearly or non-linearly decreases in size from the first region and to a minimum thickness of the wrap.

10. The composite airfoil assembly of claim 8, wherein the first thickness is constant.

11. A turbine engine including the composite airfoil assembly of claim 1, the turbine engine further comprising a fan section, a compressor section, a combustion section, and a turbine section in serial flow arrangement and defining a stator portion and a rotor portion, which rotates about an engine centerline, the composite airfoil being provided within the rotor portion.

12. A turbine engine including the composite airfoil assembly of claim 1, the turbine engine being an unducted turbine engine and the composite airfoil is an external fan blade.

13. The composite airfoil assembly of claim 1, wherein the composite airfoil assembly is a composite variable pitch airfoil assembly.

14. The composite airfoil assembly of claim 13, wherein the composite airfoil assembly is located within a turbine engine having a fan section having a plurality of fan blades, with the composite airfoil assembly being provided within the plurality of fan blades.

15. The composite airfoil assembly of claim 1, wherein the wrap includes a first region and a second region extending from the first region and to a perimeter surface of the wrap, the second region being defined by a portion of the wrap that decreases in thickness between the first region and the perimeter surface.

16. A composite airfoil assembly comprising:
a composite airfoil having an outer wall extending between a root and a tip, and defining an interior, the composite airfoil having a composite skin forming at least a portion of the outer wall;
a spar having a spar centerline axis, a stem extending into at least a portion of the interior, a base located exterior the root of the composite airfoil, and a transition interconnecting the stem and the base; and
a wrap at least partially encircling the transition;
wherein the composite skin extends axially over the transition with respect to the spar centerline axis, and the composite skin is located radially between the wrap and the transition with respect to the spar centerline axis.

17. A composite airfoil assembly comprising:
a composite airfoil having an outer wall extending between a root and a tip, and defining an interior, the composite airfoil having a composite skin forming at least a portion of the outer wall;
a spar having a spar centerline axis, a stem extending into at least a portion of the interior, a base located exterior the root of the composite airfoil, and a transition interconnecting the stem and the base; and
a wrap at least partially encircling the transition;
wherein the wrap extends axially beyond the transition and over at least a portion of the composite skin.

18. A composite airfoil assembly comprising:
a composite airfoil having an outer wall extending between a root and a tip, and defining an interior, the composite airfoil having a composite skin forming at least a portion of the outer wall;
a spar having a spar centerline axis, a stem extending into at least a portion of the interior, a base located exterior the root of the composite airfoil, and a transition interconnecting the stem and the base;
a first wrap at least partially encircling the transition including a metallic material; and
a second wrap at least partially encircling the first wrap, the second wrap including a composite material.

19. A composite airfoil assembly comprising:
a composite airfoil having an outer wall extending between a root and a tip, and defining an interior, the composite airfoil having a composite skin forming at least a portion of the outer wall;
a spar having a spar centerline axis, a stem extending into at least a portion of the interior, a base located exterior the root of the composite airfoil, and a transition interconnecting the stem and the base; and
a wrap at least partially encircling the transition;
wherein the wrap includes circumferentially distal ends with a gap formed therebetween.

\* \* \* \* \*